United States Patent
Pelzl et al.

(10) Patent No.: US 11,961,193 B2
(45) Date of Patent: Apr. 16, 2024

(54) METHOD FOR CONTROLLING A DISPLAY, COMPUTER PROGRAM AND MIXED REALITY DISPLAY DEVICE

(71) Applicant: APOQLAR GMBH, Hamburg (DE)

(72) Inventors: Sirko Pelzl, Hamburg (DE); Michael Wozniak, Poznan (PL)

(73) Assignee: APOQLAR GMBH, Hamburg (DE)

( * ) Notice: Subject to any disclaimer, the term of this patent is extended or adjusted under 35 U.S.C. 154(b) by 15 days.

(21) Appl. No.: 17/634,982

(22) PCT Filed: Sep. 9, 2020

(86) PCT No.: PCT/EP2020/075127
§ 371 (c)(1),
(2) Date: Feb. 13, 2022

(87) PCT Pub. No.: WO2021/048158
PCT Pub. Date: Mar. 18, 2021

(65) Prior Publication Data
US 2022/0292786 A1    Sep. 15, 2022

(30) Foreign Application Priority Data
Sep. 9, 2019   (EP) .................................... 19196193

(51) Int. Cl.
G06T 19/00   (2011.01)
G06T 7/10    (2017.01)
G06T 7/194   (2017.01)
H04N 13/111  (2018.01)
H04N 13/156  (2018.01)

(52) U.S. Cl.
CPC ............ *G06T 19/006* (2013.01); *G06T 7/194* (2017.01); *H04N 13/111* (2018.05);
(Continued)

(58) Field of Classification Search
None
See application file for complete search history.

(56) References Cited

U.S. PATENT DOCUMENTS 9,892,564 B1 *  2/2018  Cvetko ................... G06T 15/04
10,010,379 B1   7/2018  Gibby
(Continued)

FOREIGN PATENT DOCUMENTS

WO    2005088539 A2    9/2005

OTHER PUBLICATIONS

Liu et al., Machine translation of CN 109919208, published Jun. 2019 (Year: 2019).*
(Continued)

*Primary Examiner* — Tapas Mazumder
(74) *Attorney, Agent, or Firm* — WC&F IP (57) ABSTRACT

Method for controlling a display of a mixed reality display device, wherein source and target point clouds representing a treatment objects surface are generated from image data and from medical imaging data of the treatment object. A number of segmentation masks are determined in the point clouds by applying semantic segmentation. A transformation between the source point cloud and the target point cloud is determined using the segmentation masks, and at least a part of the medical imaging data is superimposed on the treatment object using the determined transformation.

20 Claims, 3 Drawing Sheets

(52) U.S. Cl.
CPC ....... *H04N 13/156* (2018.05); *G06T 2200/04* (2013.01); *G06T 2207/30041* (2013.01); *G06T 2210/41* (2013.01); *G06T 2210/56* (2013.01)

(56) References Cited

U.S. PATENT DOCUMENTS

| | | | |
|---|---|---|---|
| 10,897,558 B1* | 1/2021 | Sun | G06T 5/002 |
| 2017/0024874 A1* | 1/2017 | Pang | G06V 40/113 |
| 2018/0239144 A1* | 8/2018 | Woods | A63F 13/213 |

OTHER PUBLICATIONS

Zaganadis et al., "Integrating Deep Semantic Segmentation into 3D Point Cloud Registration", Jan. 1, 2018 (Jan. 1, 2018), pp. 2942-2949, XP055664374, DOI: 10.1109/LRA.2018.2848308, (Year: 2018).*
Charles et al., "PointNet++: Deep Hierarchical Feature Learning on Point Sets in a Metric Space", arxiv.org, Cornell University Library, 201 Olin Library Cornell University Ithaca, NY 14853, Jun. 8, 2017 (Jun. 8, 2017 (Year: 2017).*
Anestis Zaganidis et al, "Integrating Deep Semantic Segmentation into 3D Point Cloud Registration", URL:https://github.com/mengyuest/iros2018-slam-papers/raw/master/9deepslam/5.Integrating%20Deep%20Semantic%20Segmentation%20into%203D%20Point%20Cloud%20Registration.pdf.
Charles R Qi et al, "PointNet++: Deep Hierarchical Feature Learning on Point Sets in a Metric Space", arxiv.org, Cornell University Library, 201 Olin Library Cornell University Ithaca, NY 14853, Jun. 8, 2017 (Jun. 8, 2017).

* cited by examiner

METHOD FOR CONTROLLING A DISPLAY, COMPUTER PROGRAM AND MIXED REALITY DISPLAY DEVICE

The invention is related to a method for controlling a display of a mixed reality device.

Furthermore, the invention is related to a computer program having program code means adapted to perform such a method.

Moreover, the invention is related to a mixed reality display device with such a computer program.

In general, the invention concerns the field of visualization of virtual information in combination with the real environment. The virtual information is superimposed on real objects on a display of a display device. This area is commonly called "mixed reality".

The "virtuality continuum" extends from the purely real environment to the purely virtual environment, including augmented reality and augmented virtuality ranging between these extrema. The term "mixed reality" is generally defined as "anywhere between the extrema of the virtuality continuum", i.e. mixed reality generally comprises the complete virtuality continuum except for pure reality and pure virtuality. In the context of the present application, the term "mixed reality" may particularly refer to "augmented reality".

Mixed reality technology is especially promising for medical applications, e.g. for medical surgery or other medical treatment. For example, medical imaging data (CT images, MRI images etc.) visualizing the anatomy and/or the physiological processes of a human or animal body can be superimposed on the real world view of the body by means of a mixed reality display device. In this way, for example, surgeons can be supported during surgery by virtually placing such medical imaging data directly on the treatment object, i.e. on the patient's body or a part thereof.

One of the most important challenges in mixed reality is the registration problem, i.e. the problem of properly aligning the objects in the real world and the objects in the virtual world with respect to each other. Without accurate registration, the illusion that the two worlds coexist will be compromised. More seriously, in medical applications, risks for the medical treatment's success and even for the patient's health may result from inaccurate registration. As a result, it is crucial that the virtual information being visualized, e.g. the medical imaging data, precisely matches the real world, i.e. the treatment object, in its position, size and perspective.

From EP 2 874 556 B1, a method and a corresponding system based on augmented reality are known that enable instrument guidance in surgeries and other interventional procedures. For this purpose, an interventional path for use in the interventional procedure is obtained, wherein the interventional path is planned based on 3D image data of a patient's interior, and a camera image of the patient's exterior is obtained during the interventional procedure. A spatial correspondence is established between the camera image and the 3D image data and a view of the interventional path is calculated that corresponds with the camera image. Finally, the view of the interventional path is combined with the camera image to obtain a composite image, which is displayed on a display.

It is an object of the present invention to provide an improved technique for visualizing virtual information in medical applications that allows an improved alignment of virtual and real objects.

The object of the invention is achieved by a method for controlling a display of a mixed reality display device with the features of claim 1.

According to the invention, the method comprises at least the following steps:

a) providing an image data set comprising a plurality of images of a treatment object, wherein the treatment object is a patient's body or a part thereof and the images depict the treatment object from different perspectives, b) generating a 3D target point cloud from the image data set, wherein the target point cloud comprises a multitude of points defined in a three-dimensional coordinate system and the points represent the treatment object's surface, c) determining a number of semantic segmentation masks in the target point cloud by applying semantic segmentation, d) providing a medical imaging data set that comprises medical imaging data of the treatment object, e) generating a 3D source point cloud from the medical imaging data set, wherein the source point cloud comprises a multitude of points defined in a three-dimensional coordinate system and the points also represent the treatment object's surface, f) determining a number of semantic segmentation masks in the source point cloud by applying semantic segmentation, g) determining a transformation between the source point cloud and the target point cloud using the segmentation masks of the source point cloud and the segmentation masks of the target point cloud, and h) visualizing at least a part of the medical imaging data on the display, wherein the medical imaging data is superimposed on the treatment object and aligned with the treatment object using the transformation between the source point cloud and the target point cloud.

The steps of the method do not have to be executed in the specified order and the invention is not limited accordingly, i.e. the alphabetic order of the letters does not imply a specific sequence of steps a) to h). For example, as a matter of course, steps a) to c) could be executed after steps d) to f), or some of the method's steps could be executed in parallel.

The invention proposes a method for controlling the display of the mixed reality device to superimpose medical imaging data on the treatment object. The invention thus proposes a method for controlling the display of the mixed reality device to visualize medical imaging data on the treatment object.

In the context of the present application, the term "treatment object" refers to a patient's body or a part thereof. The patient may be a human or an animal, i.e. the treatment object may be a human or animal body or a part thereof.

The terms "mixed reality display device" and "mixed reality device" are used interchangeably. The term "computer" is uses in its broadest sense, i.e. it refers to any processing device that can be instructed to carry out sequences of arithmetic and/or logical operations.

The term "2D" refers to two-dimensional coordinates. The term "3D" refers to three-dimensional coordinates. The term "4D" refers to four-dimensional coordinates.

In addition to the display, the mixed reality device may comprise a computer and a memory. The mixed reality device may also comprise a plurality of computers. Moreover, the mixed reality device may comprise a camera, in particular a 3D camera system, and/or a number of sensors, in particular at least one depth sensor, e.g. a time-of-flight depth sensor. The mixed reality display device may also comprise a positioning system and/or an inertial measurement unit.

In step a), an image data set comprising a plurality of images of the treatment object is provided, wherein the images depict the treatment object from different perspectives. These images represent a real world view of the treatment object. They can be generated, for example, by means of a camera and/or a depth sensor, in particular by means of a camera and/or a depth sensor of the mixed reality device.

In step d), a medical imaging data set comprising medical imaging data of the treatment object is provided. This medical imaging data represents the virtual information to be visualized on the display. The medical imaging data may comprise, for example, sectional images of the treatment object. The medical imaging data may be generated, for example, using a medical imaging method like magnetic resonance imaging (MRI). The medical imaging data may be generated before and/or during the medical treatment, e.g. before and/or during surgery.

In steps b) and e), three-dimensional point clouds are generated that represent the treatment object'. For this purpose, methods of 3D reconstruction can be used.

In steps c) and f), semantic segmentation is applied to determine a number of segmentation masks in the target point cloud and the source point cloud, respectively. Semantic segmentation (also referred to as semantic image segmentation) can be defined as the task of clustering parts of images together that belong to the same object class. In the context of the present application, the object class may be, for example, a specific part of the treatment object's anatomy. If the treatment object is a human head, for example, simple object classes may include nose, ears, mouth, eyes, eyebrows etc. The term "semantic segmentation mask" refers to a part (or segment) of the image that has been determined, using semantic segmentation, as belonging to the same object class. Semantic segmentation can be performed in 2D data, i.e. based on pixels, or in 3D data, i.e. based on voxels.

In step g), a transformation between the source point cloud and the target point cloud is determined using the segmentation masks of the source point cloud and the segmentation masks of the target point cloud. In this step, a transformation can be determined that, when applied to one of the point clouds, aligns the points of both point clouds with each other. The transformation can include translation and/or rotation. For example, the transformation can have the form of a transformation matrix, in particular the form of a 4×4 transformation matrix. The determined transformation can transform, in particular approximately, the source point cloud to the target point cloud or vice versa.

In addition to the segmentation masks, other parameters can be used as inputs for determining the transformation between the point clouds. In particular, the transformation between the source point cloud and the target point cloud can be determined using the segmentation masks of the source point cloud and the segmentation masks of the target point cloud and the coordinates of the points of the source point cloud and the coordinates of the points of the target point cloud.

In step h), the medical imaging data is visualized on the display, wherein the medical imaging data is superimposed on the real world view of the treatment object and aligned with it using the transformation determined in step g). In doing so, a virtual fusion of the visualized medical imaging data and the real world view of the treatment object is created.

The invention is based on the finding that by using semantic segmentation, the registration problem can be solved more accurately and more reliably. This is achieved by determining a transformation between the source point cloud and the target point cloud based on the segmentation masks of both point clouds.

By way of example, an optimization function used to determine the transformation between the source point cloud and the target point cloud can be designed to favor transformations that accurately match corresponding semantic segmentation masks in both point clouds, i.e. transformations that accurately match semantic segmentation masks with identical and/or similar object classes (e.g. nose, ear, eyes, eyebrows). This can be realized, for example, by using a four-dimensional optimization algorithm to determine the transformation between the source point cloud and the target point cloud, wherein for each point of the respective point cloud, the object class (e.g. nose, ear, mouth) of the corresponding semantic segmentation mask is interpreted as a fourth dimension of the point (in addition to the point's 3D coordinates). For example, a 4D variant of the Iterative Closest Point (ICP) algorithm may be used for this purpose.

The invention allows aligning the virtual information of the medical imaging data very accurately and reliably with the real world view of the treatment object. As a result, an improved virtual fusion of the visualized medical imaging data and the real world view of the treatment object can be created, and risks for the medical treatment's success and for the patient's health can be avoided.

According to an advantageous embodiment of the invention, it is proposed that the display is designed as an optical see-through display, in particular as an optical see-through head-mounted display.

Such embodiments of the invention provide the advantage of a realistic and intuitive perception of the real environment for the user, e.g. a surgeon.

According to another advantageous embodiment of the invention, it is proposed that the mixed reality display device comprises or consists of a head-mounted mixed reality display device and/or mixed reality smartglasses. The mixed reality display device may, for example, comprise or consist of a Microsoft HoloLens device or a Microsoft HoloLens 2 device or a similar device.

Such embodiments of the invention provide the advantage that they are convenient to use and at the same time offer powerful hardware for visualizing virtual information to the user. In particular, many head-mounted mixed reality display devices and mixed reality smartglasses comprise, in addition to the display, powerful and versatile integrated hardware components including high-performance processors and memory, 3D camera systems and time-of-flight depth sensors, positioning systems and/or an inertial measurement units.

According to another advantageous embodiment of the invention, the mixed reality display device may comprise an additional external computer, e.g. an external server, which is connected to the display and adapted to execute at least parts of the method proposed according to the invention. The mixed reality display device may, for example, comprise a head-mounted mixed reality display device and/or mixed reality smartglasses and an additional computer, e.g. an external server, which is connected to the head-mounted mixed reality display device and/or mixed reality smartglasses, respectively, by means of a wired or wireless connection. The external server may be designed as a cloud server.

Such embodiments provide the advantage of additional computation power for complex and computationally intensive operations, which are particularly common in the relevant fields of computer vision and computer graphics.

According to another advantageous embodiment of the invention, all components of the mixed reality display device may be integrated in the head-mounted mixed reality display device and/or the mixed reality smartglasses. This provides the advantage of a compact and hence highly mobile mixed reality display device.

According to another advantageous embodiment of the invention, it is proposed that the medical imaging data is generated using at least one of the following medical imaging methods: magnetic resonance imaging (MRI), computed tomography (CT), cone beam computed tomography (CBCT), digital volume tomography (DVT), fluoroscopic intraoperative images, X-rays, radiography, ultrasonography, endoscopy and/or nuclear medicine imaging.

This provides the advantage that the results of powerful and versatile modern medical imaging methods can be beneficially utilized during medical treatment, e.g. during surgery, by means of mixed reality visualization. This allows, for example, visualizing the patient's internal organs and/or carcinomas and/or other internal defects of the patient's body.

According to another advantageous embodiment of the invention, it is proposed that the semantic segmentation masks in the target point cloud and/or the semantic segmentation masks in the source point cloud are determined using a convolutional neural network configured for semantic segmentation.

Semantic segmentation by means of convolutional neural networks (CNNs) has made impressive progress in the last few years. Appropriately designed and trained CNNs allow reliable, accurate and fast semantic segmentation of 2D and even 3D image data. Embodiments of the invention that employ a CNN for semantic segmentation hence provide the advantage that the powerful capabilities of CNNs can be utilized to improve mixed reality visualization. For example, the U-Net CNN architecture may be used for this purpose, i.e. the convolutional neural network configured for semantic segmentation may be designed as a U-NET CNN.

The CNN can be trained for semantic segmentation of a body or a specific part of the body using appropriate training data sets that include semantic segmentation masks labeled with their respective object class (e.g. nose, ear, eyes, eyebrows in case of a training set for a human head).

According to another advantageous embodiment of the invention, it is proposed that step c) comprises the following:
determining a number of semantic segmentation masks in the images of the image data set by applying semantic segmentation to the images of the image data set, in particular using a convolutional neural network configured for semantic segmentation, and
determining the semantic segmentation masks in the target point cloud using the semantic segmentation masks in the images of the image data set.

According to this embodiment, it is proposed that semantic segmentation masks are determined in the images of the image data set. The images may particularly be designed as 2D images, in particular 2D RGB images. Based on these semantic segmentation masks in the images, 3D semantic segmentation masks can be determined in the target point cloud. For example, each point of the 3D target point cloud could be projected to the 2D image to determine the semantic segmentation mask in the 2D image that corresponds to the respective point in the 3D target point cloud.

Such an embodiment provides the advantages that it facilitates semantic segmentation and allows using sophisticated available methods for semantic segmentation in 2D images, in particular in 2D RGB images, to determine the semantic segmentation masks. For example, powerful convolutional neural networks and corresponding training data sets are available for semantic segmentation in 2D RGB images. Using their potential allows a fast, accurate and reliable semantic segmentation of the 2D images. These results can be transferred to the 3D point cloud to utilize them for the purposes of the claimed method, i.e. for determining an accurate transformation between the source point cloud and the target point cloud.

According to another advantageous embodiment of the invention, it is proposed that the image data set comprises a plurality of visual images and/or depth images of the treatment object and the 3D target point cloud is generated from the visual images and/or the depth images, in particular using a photogrammetry method and/or a depth fusion method.

The visual images may be generated by means of a camera, in particular a 3D camera system. The visual images may be designed as, for example, RGB images and/or grayscale images. The depth images may be generated by means of a 3D scanner and/or a depth sensor, in particular by means of a 3D laser scanner and/or a time-of-flight depth sensor. The depth images may be designed as depth maps. The combination of visual images and depth images may be designed RGB-D image data. The images of the image data set may thus be designed as RGB-D images.

The 3D target point cloud may be generated from the visual images and/or the depth images using 3D reconstruction methods, in particular active and/or passive 3D reconstruction methods.

The 3D target point cloud may be generated from the visual images using photogrammetry. In particular, the 3D target point cloud may be generated from the visual images using a Structure-from-Motion (SfM) process and/or a Multi-View Stereo (MVS) process. For example, the COLMAP 3D reconstruction pipeline can be used for this purpose.

The 3D target point cloud may be generated from the depth images using depth fusion, i.e. using 3D reconstruction from multiple depth images. The depth fusion may be based on the Truncated Signed Distance Function (TSDF). For example, the Point Cloud Library (PCL) may be used to generate the depth images using depth fusion. For example, Kinect Fusion may be used as a depth fusion method. In particular, a Kinect Fusion implementation contained in PCL may be used for this purpose, e.g. KinFu.

Such embodiments of the invention that comprise generating the 3D target point cloud from visual images and/or depth images, as explained above, provide the advantage that an accurate and detailed reconstruction of the treatment object's surface can be achieved.

According to another advantageous embodiment of the invention, it is proposed that step c) comprises the following:
determining a number of semantic segmentation masks in the visual images and/or in the depth images of the image data set by applying semantic segmentation to the visual images and/or the depth images of the image data set, in particular using a convolutional neural network configured for semantic segmentation, and determining the semantic segmentation masks in the target point cloud using the semantic segmentation masks in the visual images and/or the depth images of the image data set.

Such embodiments provide the advantages that they facilitate semantic segmentation and allow using sophisticated available methods for semantic segmentation in 2D images and/or in depth images to determine the semantic segmentation masks. The resulting semantic segmentation masks in the visual images and/or in the depth images can be transferred to the 3D point cloud to utilize them for the purposes of the claimed method, i.e. for determining an accurate transformation between the source point cloud and the target point cloud. In doing so, a fast, accurate and detailed reconstruction of the treatment object's surface can be achieved.

According to another advantageous embodiment of the invention, it is proposed that the image data set comprises a plurality of visual images and depth images of the treatment object and step b) comprises the following:

generating a first 3D point cloud from the visual images of the image data set, generating a second 3D point cloud from the depth images of the image data set, and generating the 3D target point cloud using the first 3D point cloud and the second 3D point cloud, in particular by merging the first 3D point cloud and the second 3D point cloud.

Such an embodiment provides the advantage that accuracy and completeness of the 3D reconstruction can be improved and hence accuracy and completeness of the resulting target point cloud can be improved. This is achieved by merging the first 3D point cloud, which may be a RGB-based point cloud, with the second 3D point cloud, which is a depth-based point cloud.

According to another advantageous embodiment of the invention, it is proposed that step f) comprises determining a number of semantic segmentation masks in the medical imaging data of the medical imaging data set by applying semantic segmentation to the medical imaging data of the medical imaging data set, in particular using a convolutional neural network configured for semantic segmentation and determining the semantic segmentation masks in the source point cloud using the semantic segmentation masks in the medical imaging data of the medical imaging data set.

According to this embodiment, it is proposed that semantic segmentation masks are determined in the medical imaging data of the medical imaging data set. The medical imaging data may comprise 2D medical images, in particular 2D sectional images, and semantic segmentation masks may be determined in these 2D medical images. Based on these semantic segmentation masks in the medical imaging data, 3D semantic segmentation masks can be determined in the source point cloud. For example, each point of the 3D source point cloud could be projected to the 2D medical image to determine the semantic segmentation mask in the 2D medical image that corresponds to the respective point in the 3D source point cloud.

Such an embodiment provides the advantages that it facilitates semantic segmentation and allows using sophisticated available methods for medical semantic segmentation in 2D images to determine the semantic segmentation masks. For example, powerful convolutional neural networks and corresponding training data sets are available for medical semantic segmentation in 2D medical images. An example includes the U-Net convolutional neural network architecture. Using the potential of these CNNs allows fast and precise semantic segmentation of the 2D medical images. These results can be transferred to the 3D point cloud to utilize them for the purposes of the claimed method, i.e. for determining an accurate transformation between the source point cloud and the target point cloud.

The medical imaging data may also comprise 3D medical imaging data, for example, a 3D medical imaging model of the treatment object. The 3D medical imaging data may be reconstructed from a plurality of 2D medical images, in particular 2D sectional images, of the treatment object. These 2D medical images may be generated using a medical imaging method. In such embodiments where the medical imaging data also comprises 3D medical imaging data, the semantic segmentation masks may also be determined in the 3D medical imaging data. 3D semantic segmentation methods, in particular based on convolutional neural networks configured for 3D semantic segmentation, may be used for this purpose. Based on the semantic segmentation masks in the 3D medical imaging data, 3D semantic segmentation masks can be determined in the source point cloud.

According to another advantageous embodiment of the invention, it is proposed that step c) comprises determining the semantic segmentation masks in the target point cloud by directly applying semantic segmentation to the target point cloud, in particular using a convolutional neural network configured for semantic segmentation, and/or step f) comprises determining the semantic segmentation masks in the source point cloud by directly applying semantic segmentation to the source point cloud, in particular using a convolutional neural network configured for semantic segmentation.

According to another advantageous embodiment of the invention, it is proposed that the transformation between the source point cloud and the target point cloud is determined in step g) by means of an Iterative Closest Point (ICP) algorithm using the coordinates of the points of the source point cloud and the segmentation masks of the source point cloud and the coordinates of the points of the target point cloud and the segmentation masks of the target point cloud.

According to this embodiment, it is proposed that an Iterative Closest Point (ICP) algorithm is used to determine the transformation between the source point cloud and the target point cloud. In particular, a 4D variant of the ICP algorithm may be used for this purpose. The coordinates of the points and the segmentation masks of the source point and target point cloud are used as inputs for the ICP algorithm. This can be realized, for example, by using a 4D variant of the ICP algorithm to determine the transformation between the source point cloud and the target point cloud, wherein for each point of the respective point cloud, the object class (e.g. nose, ear, mouth) of the corresponding semantic segmentation mask is interpreted as a fourth dimension of the point (in addition to the point's 3D coordinates). By including the semantic segmentation masks in the ICP algorithm as explained above, the ICP algorithm takes into account not only the spatial information of the points of the point clouds (i.e. their coordinates), but their semantics, i.e. their meaning, too.

The semantic segmentation masks may also be used to determine an initial estimation of the transformation between the source point cloud and the target point cloud for the ICP algorithm, i.e. to determine an initial alignment.

The embodiments explained above provide the advantage that they improve the guidance of the ICP algorithm to find an optimal transformation between the source point cloud point cloud and the target point cloud. For example, by using semantic segmentation masks for determining the transformation, it can be avoided that the ICP algorithm finds a local optimum as a solution. Therefore, the accuracy of the transformation and hence the alignment of the medical imaging data with the treatment object can be improved.

According to another advantageous embodiment of the invention, it is proposed that
- step a) comprises removing a background and/or other irrelevant parts from the images of the treatment object using semantic segmentation, in particular using a convolutional neural network configured for semantic segmentation, and/or
- step d) comprises removing a background and/or other irrelevant parts from the medical imaging data of the treatment object using semantic segmentation, in particular using a convolutional neural network configured for semantic segmentation.

Irrelevant parts may be parts of the images or the medical imaging data, respectively, that are not relevant for the purposes of medical imaging and/or not relevant for superimposing the medical imaging data on the treatment object, such as the hair of a human head.

Such embodiments provide the advantage that they facilitate generating the point clouds, determining the semantic segmentations masks and determining the transformation between the point clouds.

According to another advantageous embodiment of the invention, it is proposed that the medical imaging data set comprises a 3D medical imaging model of the treatment object, wherein the 3D medical imaging model is reconstructed from a plurality of 2D sectional images of the treatment object generated by a medical imaging method.

Such embodiments provide the advantage that they can facilitate generating the 3D source point cloud, while at the same time the accuracy of the resulting 3D source point cloud can be improved.

According to another advantageous embodiment of the invention, it is proposed that in step a), the image data set comprising the images of the treatment object is created by means of a camera, in particular a 3D camera system, of the mixed reality display device, and/or by means of a depth sensor, in particular by means of a time-of-flight depth sensor, of the mixed reality display device.

In this way, the image data set, which is necessary for generating the target point cloud, can be created and provided for the purposes of the invention in a very simple and user-friendly way. For example, using the mixed reality display device's camera and/or depth sensor, the images of the image data set can be created by automatically scanning the treatment object. In particular, if the mixed reality display device comprises or consists of a head-mounted mixed reality display device and/or mixed reality smartglasses, the camera and/or the depth sensor can be integrated into the head-mounted mixed reality display device and/or mixed reality smartglasses, respectively. In this case, the user can simply direct his head towards the part of the treatment object to be scanned.

According to another advantageous embodiment of the invention, it is proposed that
- in step a), when the images are created by means of the camera of the mixed reality display, the position of the camera is determined in a three-dimensional coordinate system for each image and stored as 3D camera position and in step b), the target point cloud is generated using the 3D camera positions, and/or
- in step a), when the images are created by means of the camera of the mixed reality display, the orientation of the camera is determined in a three-dimensional coordinate system for each image and stored as 3D camera orientation and in step b), the target point cloud is generated using the 3D camera orientations.

Such embodiments provide the advantage that they allow a particularly precise and reliable generation of the target point cloud from the image data set.

According to another advantageous embodiment of the invention, it is proposed that any position, any orientation and any transformation determined in steps a) to h) is determined markerless and/or using Simultaneous Localization and Mapping (SLAM).

Such embodiments provide the advantage that they are particularly comfortable for the user, as no optical markers or other fiducial markers have to be provided.

The object of the invention is further achieved by a computer program having program code means adapted to perform a method as described above when the computer program is executed on a computer.

The object of the invention is further achieved by a mixed reality display device having a display, a computer and a memory, wherein the computer program described above is stored in the memory and the computer is adapted to execute the computer program.

The computer program may be designed as a distributed computer program. The computer and the memory may be designed as a distributed computer and a distributed memory, respectively, i.e. the computer that is adapted to execute the computer program may comprise two or more computers. The distributed memory may comprise multiple memories, wherein each memory may store at least a part of the distributed computer program, and each of the two or more computers may be adapted to execute a part of the distributed computer program.

In addition, the mixed reality display device may have an interface that is adapted to receive the medical imaging data from an external source. The interface may be adapted, for example, to be connected to a medical imaging device, e.g. a magnetic resonance imaging (MRI) device and/or a computer tomography (CT) device, and/or to a memory that stores the medical imaging data. This may include a wired and/or wireless connection.

As mentioned above, the mixed reality display device may comprise or consist of a head-mounted mixed reality display device and/or mixed reality smartglasses. The mixed reality display device may, for example, comprise or consist of a Microsoft HoloLens device or a Microsoft HoloLens 2 device or a similar device.

As mentioned above, the mixed reality display device may comprise an additional external computer, e.g. an external server, which is connected to the display and adapted to execute at least parts of the method proposed according to the invention. The mixed reality display device may, for example, comprise a head-mounted mixed reality display device and/or mixed reality smartglasses and an additional computer, e.g. an external server, which is connected to the head-mounted mixed reality display device and/or mixed reality smartglasses, respectively, by means of a wired and/or wireless connection. The external server may be designed as a cloud server.

As mentioned above, all components of the mixed reality display device may be integrated in the head-mounted mixed reality display device and/or the mixed reality smartglasses.

In the following, the invention will be explained in more detail using the exemplary embodiments schematically shown in the attached drawings. The drawings show the following.

Figure 1:
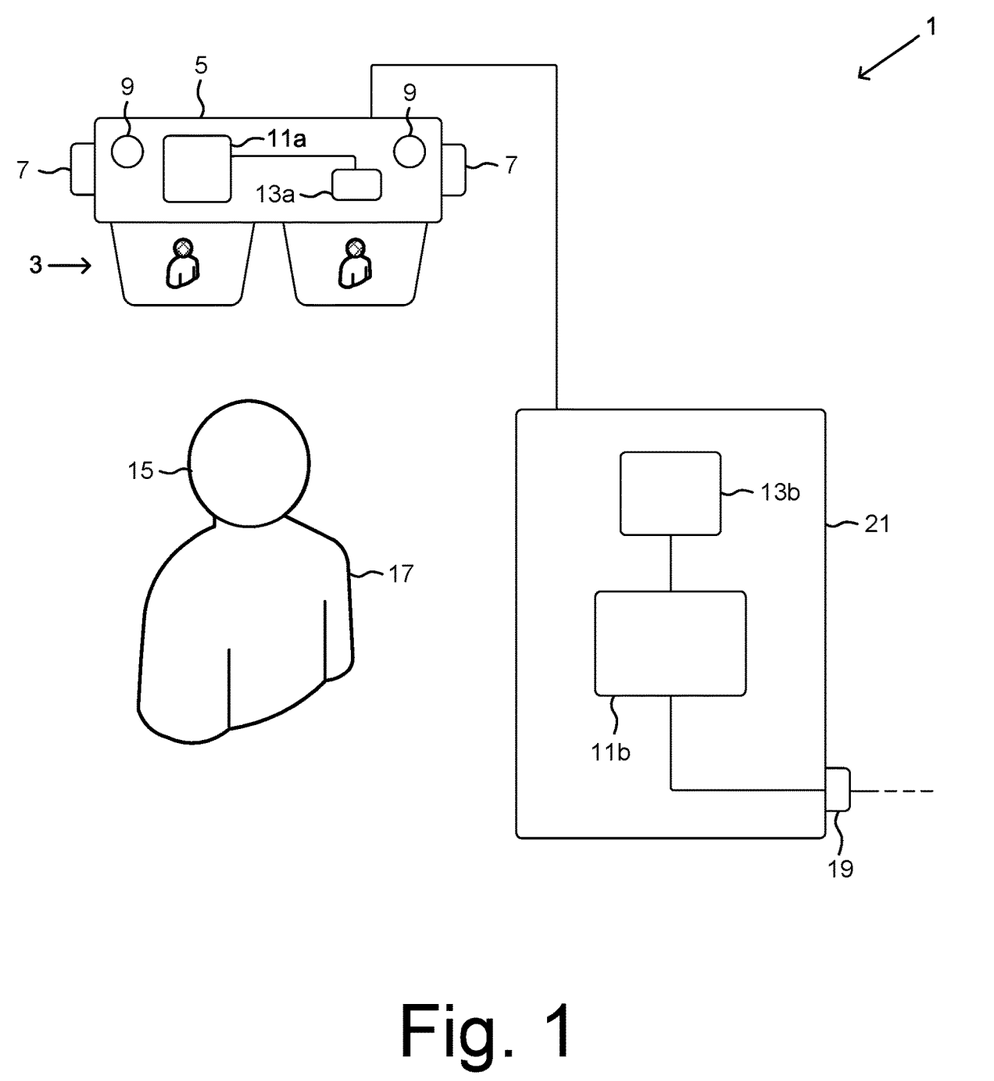
FIG. 1—a schematic representation of a mixed reality display device according to the invention.

FIG. 1 shows a schematic representation of a mixed reality display device 1, which comprises a head-mounted mixed reality display device in the form of a pair of mixed reality smartglasses 5. In this exemplary embodiment, the mixed reality smartglasses 5 are of the type Microsoft HoloLens. The smartglasses 5 have a memory 13a and a computer 11a connected with the memory 13a, wherein the computer 11a comprises several processing units, namely a CPU (Central Processing Unit), a GPU (Graphics Processing Unit) and a HPU (Holographic Processing Unit).

Moreover, the smartglasses 5 of the mixed reality display device 1 have a camera 9 in the form of a 3D camera system. The camera 9 is adapted to create visual images of a treatment object 15 from different perspectives. Furthermore, the smartglasses 5 comprise a plurality of sensors 7, including a time-of-flight depth sensor that is adapted to create depth images of the treatment object 15 from different perspectives. In this exemplary embodiment, the treatment object 15 is the head of a human patient 17.

In addition, the smartglasses 5 of the mixed reality display device 1 have display 3, which is designed as an optical see-through head-mounted display in this exemplary embodiment. The see-through display 3 is adapted to visualize virtual information, in this exemplary embodiment medical imaging data, by superimposing the virtual information on the real view of the treatment object 15.

Furthermore, FIG. 1 illustrates that the mixed reality display device 1 comprises a server 21, which is connected to the smartglasses 5 via a wireless and/or wired connection. The server 21 comprises a memory 13b and a computer 11b connected with the memory 13b, wherein the computer 11b comprises a CPU and a GPU. The server 21 has an interface 19 that is adapted to receive medical imaging data from an external source, namely from a memory that stores the medical imaging data, via a wired and/or wireless connection.

Figure 2:
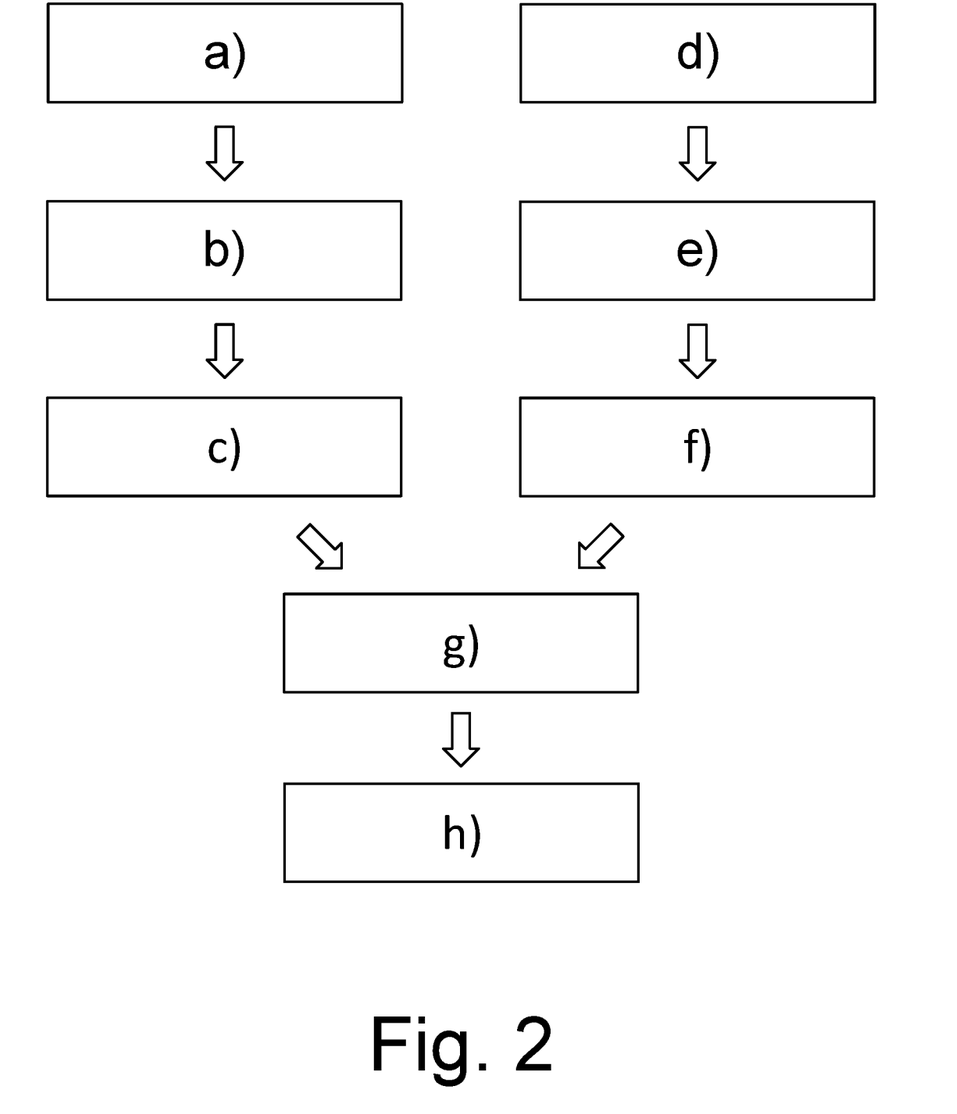
FIG. 2—a schematic representation of a method for controlling a mixed reality display device according to the invention.

FIG. 2 shows a schematic representation of an exemplary method for controlling a mixed reality display device according to the invention.

In step a), an image data set is provided that comprises a plurality of images of the treatment object 15, wherein the images depict the treatment object from different perspectives. In this exemplary embodiment, the image data set comprises a plurality of visual images in the form of 2D RGB images and a plurality of depth images in the form of depth maps. The visual images are created by means of the camera 9 of the mixed reality display device 1, and the depth images are created by means of the depth sensor 7 of the mixed reality display device 1 (see FIG. 1). In other words, this means that an image data set containing RGB-D image data is created. For this purpose, the user wearing the smartglasses 5, e.g. a surgeon, can simply direct his head towards the treatment object 15 in different perspectives and the treatment object 15 is automatically scanned from different perspectives using the camera 9 and the depth sensor 7. When the images are created, the position and the orientation of the camera 9 are determined in a three-dimensional coordinate system for each image and stored as 3D camera position and 3D camera orientation, respectively. For this purpose, Simultaneous Localization and Mapping (SLAM) is used. The 3D camera position and 3D camera orientation for each image can be referred to as extrinsic camera parameters. The image data set including the extrinsic camera parameters is transferred from the smartglasses 5 to the server 21 afterwards.

In step b), the server 21 generates a 3D target point cloud from the image data set, wherein the target point cloud comprises a multitude of points defined in a three-dimensional coordinate system and the points represent the surface of the treatment object 15. For this purpose, the extrinsic camera parameters, i.e. the 3D camera positions and the 3D camera orientations, are used.

The 3D target point cloud is generated from the visual images and the depth images. For this purpose, a first 3D point cloud is generated from the visual images of the image data set using a photogrammetry method, namely by using the COLMAP 3D reconstruction pipeline including a Structure-from-Motion (SfM) process and a Multi-View Stereo (MVS) process. Moreover, a second 3D point cloud is generated from the depth images of the image data set using depth fusion, i.e. using 3D reconstruction from multiple depth images. For this purpose, For example, the Point Cloud Library (PCL) is used, namely the Kinect Fusion implementation KinFu contained in PCL. Afterwards, the 3D target point cloud is generated by merging the first 3D point cloud and the second 3D point cloud.

In step c), a number of semantic segmentation masks in the target point cloud is determined by applying semantic segmentation.

Firstly, a number of semantic segmentation masks is determined in the 2D visual images of the image data set by applying semantic segmentation to these 2D RGB images. The semantic segmentation masks define an object class for every pixel of each 2D visual image, wherein the object classes may include an object class "other", "void" or similar for areas of the image that cannot be matched otherwise. For determining the semantic segmentation masks in the 2D visual images, a convolutional neural network configured (CNN) for semantic segmentation is used, namely a CNN based on the U-Net CNN architecture (U-Net CNN). The U-Net CNN is trained for semantic segmentation of the treatment object 15, i.e. for semantic segmentation of a human head, using appropriate training data sets that include semantic segmentation masks labeled with their respective object class (e.g. nose, ear, eyes, eyebrows).

Secondly, the semantic segmentation masks in the 3D target point cloud are determined using the previously determined semantic segmentation masks in the 2D visual images of the image data set. For this purpose, each point of the 3D target point cloud is projected to a number of 2D RGB images to determine the semantic segmentation mask in the respective 2D image that corresponds to the point in the 3D target point cloud.

Figure 3:
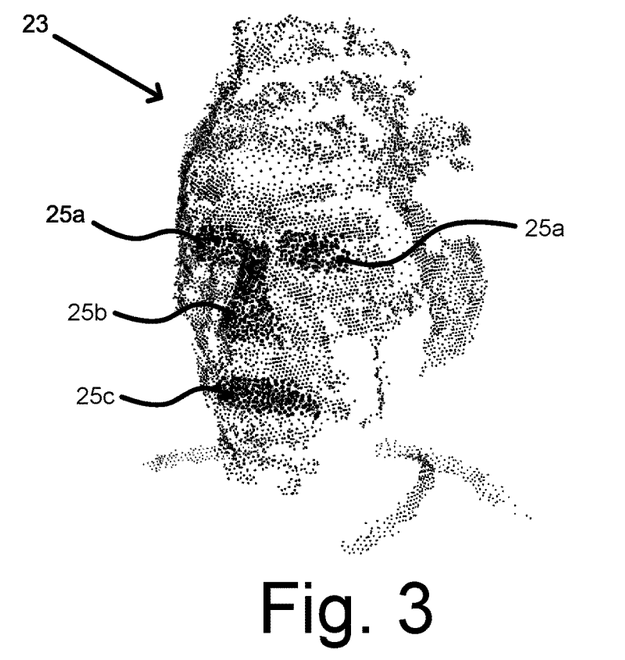
FIG. 3—a schematic representation of a 3D target point cloud with semantic segmentation masks.

FIG. 3 schematically illustrates the results of determining the semantic segmentation masks in the target point cloud. The figure shows a 3D target point cloud 23 that has been generated from the image data set. In the 3D target point cloud 23, several semantic segmentation masks 25a, 25b, 25c have been determined. Two semantic segmentation masks 25a represent the patient's right eye and left eye, respectively. Another semantic segmentation mask 25b represents the patient's nose and another semantic segmentation mask 25c represents the patient's mouth.

Referring now back to FIG. 2, in step d), a medical imaging data set that comprises medical imaging data of the treatment object is provided. In this exemplary embodiment, the medical imaging data comprises a plurality of 2D sectional images of the treatment object 15 that were created by means of magnetic resonance imaging (MRI) before a surgery. These 2D MRI images, in the form of DICOM data, are received by the server 21 via the server's interface 19. The server 21 reconstructs a 3D medical imaging model of the treatment object 15 from the plurality of 2D MRI images of the treatment object 15.

The medical imaging data may also comprise metadata, e.g. in the form of attributes stored as tags in DICOM data. Examples of such metadata include information about a slice thickness of sectional images and/or information about pixel spacing. Such metadata can be used for reconstructing the 3D imaging model and/or for generating the 3D source point cloud.

In step e), a 3D source point cloud is generated from the medical imaging data set, wherein the source point cloud comprises a multitude of points defined in a three-dimensional coordinate system and the points also represent the surface of the treatment object 15. For this purpose, the Point Cloud Library (PCL) is used.

In step f), a number of semantic segmentation masks is determined in the source point cloud by applying semantic segmentation.

Firstly, a number of semantic segmentation masks is determined in the 2D MRI images of the medical imaging data set by applying semantic segmentation to these images. The semantic segmentation masks define an object class for every pixel of each 2D MRI image, wherein the object classes may include an object class "other", "void" or similar for areas of the image that cannot be matched otherwise. For determining the semantic segmentation masks in the 2D MRI images, a convolutional neural network configured (CNN) for semantic segmentation is used, namely a CNN based on the U-Net CNN architecture (U-Net CNN). The U-Net CNN is trained for semantic segmentation of the treatment object 15, i.e. for semantic segmentation of a human head, using appropriate training data sets that include semantic segmentation masks labeled with their respective object class (e.g. nose, ear, eyes, eyebrows).

Secondly, the semantic segmentation masks in the 3D source point cloud are determined using the previously determined semantic segmentation masks in the 2D MRI images of the medical imaging data set.

Figure 4:
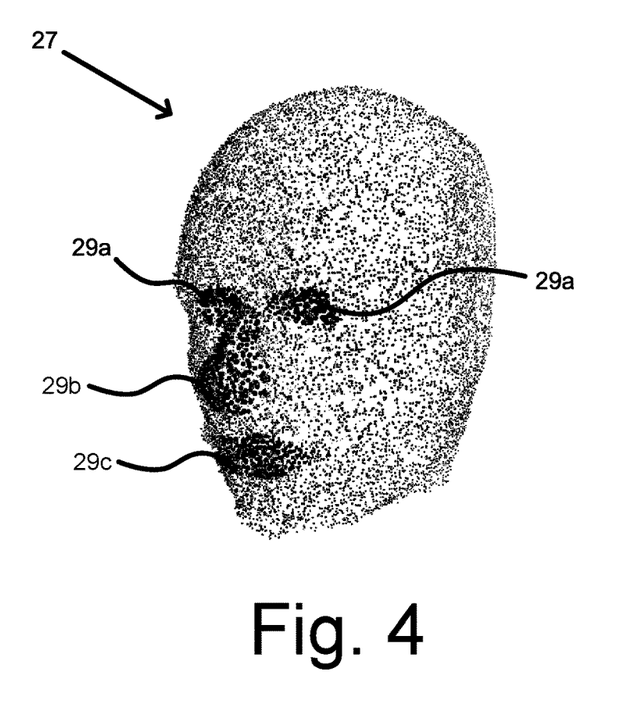
FIG. 4—a schematic representation of a 3D source point cloud with semantic segmentation masks.

FIG. 4 schematically illustrates the results of determining the semantic segmentation masks in the source point cloud. The figure shows a 3D source point cloud 27 that has been generated from the medical imaging data set. In the 3D source point cloud 27, several semantic segmentation masks 29a, 29b, 29c have been determined. Two semantic segmentation masks 29a represent the patient's right eye and left eye, respectively. Another semantic segmentation mask 29b represents the patient's nose and another semantic segmentation mask 29c represents the patient's mouth.

Referring now back to FIG. 2, in step g), a transformation between the source point cloud and the target point cloud is determined using the segmentation masks of the source point cloud and the segmentation masks of the target point cloud. In this exemplary embodiment, a 4×4 transformation matrix is determined that includes translation and rotation and, when applied to the source point cloud, aligns the points of the source point cloud with the points of the target point cloud. The determined 4×4 transformation matrix hence serves the purpose of transformation between the different view poses (position and orientation) under which the source point cloud and the target point cloud have been acquired.

In this exemplary embodiment, a 4D variant of the Iterative Closest Point (ICP) algorithm is used to determine the 4×4 transformation matrix. The coordinates of the points and the segmentation masks of the source point and target point cloud are used as inputs for the algorithm, wherein for each point of the respective point cloud, the object class (e.g. nose, ear, mouth) of the corresponding semantic segmentation mask is interpreted as a fourth dimension of the point (in addition to the point's 3D coordinates). The 4D ICP's optimization function is designed to favor transformations that accurately match corresponding semantic segmentation masks in both point clouds (nose and nose, ear and ear, mouth and mouth etc.).

The 4×4 transformation matrix and the medical imaging data are transferred from server 21 to mixed reality smartglasses 5.

In step h), at least a part of the medical imaging data, i.e. the MRI imaging data, is visualized on the optical see-through display 3 of the smartglasses 5 (see FIG. 1), wherein the medical imaging data is superimposed on the real view of the treatment object 15 and aligned with the treatment object 15 using the transformation between the source point cloud and the target point cloud, i.e. using the 4×4 transformation matrix determined in step g).

In this way, a surgeon using the a mixed reality display device 1 can be supported during surgery by virtually visualizing the anatomy of the treatment object 15, as it is indicated by the MRI images, accurately aligned with the real world view of the treatment object 15.

In this exemplary embodiment, steps a) and h) are executed by mixed reality smartglasses 5, while steps b) to g) are executed by server 21. In other embodiments, additional steps or all steps of the method may be executed by mixed reality smart glasses 5.

LIST OF REFERENCE SIGNS 1 mixed reality display device
3 display
5 mixed reality smartglasses
7 sensors
9 camera
11a, 11b computer
13a, 13b memory
15 treatment object
17 patient
19 interface
21 server
23 target point cloud
25a, 25b, 25c segmentations masks of the target point cloud
27 source point cloud
29a, 29b, 29c segmentation masks of the source point cloud

The invention claimed is:

1. A method for controlling a display of a mixed reality display device, comprising:
 a) providing an image data set comprising a plurality of images of a treatment object, wherein the treatment object is a patient's body or a part thereof and images of the plurality of images depict the treatment object from different perspectives, b) generating a 3D target point cloud from the image data set, wherein the target point cloud comprises a first multitude of points defined in a three-dimensional coordinate system and the first multitude of points represent a surface of the treatment object, c) determining a number of semantic segmentation masks in the target point cloud by applying semantic segmentation, d) providing a medical imaging data set that comprises medical imaging data of the treatment object, e) generating a 3D source point cloud from the medical imaging data set, wherein the source point cloud comprises a second multitude of points defined in a three-dimensional coordinate system and the second multitude of points also represent the surface of the treatment object, f) determining a number of semantic segmentation masks in the source point cloud by applying semantic segmentation, g) determining a transformation between the source point cloud and the target point cloud using the segmentation masks of the source point cloud and the segmentation masks of the target point cloud, and h) visibly displaying at least a part of the medical imaging data on the display while permitting a user to view the treatment object, wherein the medical imaging data is displayed superimposed on the treatment object and aligned with the treatment object using the transformation between the source point cloud and the target point cloud, wherein step c) comprises
determining a number of semantic segmentation masks in the images of the image data set by applying semantic segmentation to the images of the image data set, and
determining the semantic segmentation masks in the target point cloud using the semantic segmentation masks in the images of the image data set and/or step f) comprises
determining a number of semantic segmentation masks in the medical imaging data of the medical imaging data set by applying semantic segmentation to the medical imaging data of the medical imaging data set, and
determining the semantic segmentation masks in the source point cloud using the semantic segmentation masks in the medical imaging data of the medical imaging data set, wherein each semantic segmentation mask refers to a segment of the image that has been determined, using semantic segmentation, as belonging to the same object class.

2. The method according claim 1, the display is designed as an optical see-through display and/or the mixed reality display device comprises a head-mounted mixed reality display device.

3. The method of claim 2 wherein the head-mounted mixed reality display device is mixed reality smartglasses.

4. The method according to claim 1 wherein the medical imaging data is generated using at least one of the following medical imaging methods: magnetic resonance imaging, computer tomography, radiography, ultrasonography, endoscopy and/or nuclear medicine imaging.

5. The method according to claim 1 wherein the semantic segmentation masks in the target point cloud and/or the semantic segmentation masks in the source point cloud are determined using a convolutional neural network configured for semantic segmentation.

6. The method according to claim 1 wherein the semantic segmentation masks in the images of the image data set are determined using a convolutional neural network configured for semantic segmentation.

7. The method according to claim 1 wherein the image data set comprises a plurality of visual images and/or depth images of the treatment object and the 3D target point cloud is generated from the visual images and/or the depth images.

8. The method according to claim 7, wherein step c) comprises:
determining a number of semantic segmentation masks in the plurality of visual images and/or in the depth images of the image data set by applying semantic segmentation to the plurality of visual images and/or the depth images of the image data set, and
determining the semantic segmentation masks in the target point cloud using the semantic segmentation masks in the visual images and/or the depth images of the image data set.

9. The method according to claim 1 wherein the image data set comprises a plurality of visual images and a plurality of depth images of the treatment object and wherein step b) comprises:
generating a first 3D point cloud from the plurality of visual images of the image data set,
generating a second 3D point cloud from the plurality of depth images of the image data set, and
generating the 3D target point cloud using the first 3D point cloud and the second 3D point cloud.

10. The method of claim 9 wherein the generating the 3D target point cloud is performed by merging the first 3D point cloud and the second 3D point cloud.

11. The method according to claim 1 wherein the semantic segmentation masks in the medical imaging data of the medical imaging data set are determined using a convolutional neural network configured for semantic segmentation.

12. The method according to claim 1 wherein
step c) comprises determining the semantic segmentation masks in the target point cloud by directly applying semantic segmentation to the target point cloud, and/or
step f) comprises determining the semantic segmentation masks in the source point cloud by directly applying semantic segmentation to the source point cloud.

13. The method according to claim 1 wherein the transformation between the source point cloud and the target point cloud is determined by an Iterative Closest Point algorithm using coordinates of the points of the source point cloud and the segmentation masks of the source point cloud and coordinates of the points of the target point cloud and the segmentation masks of the target point cloud.

14. The method according to claim 1 wherein
step a) comprises removing a background and/or other irrelevant parts from the plurality of images of the treatment object using semantic segmentation, and/or
step d) comprises removing a background and/or other irrelevant parts from the medical imaging data of the treatment object using semantic segmentation.

15. The method according to claim 1 wherein the medical imaging data set comprises a 3D medical imaging model of the treatment object, wherein the 3D medical imaging model is reconstructed from a plurality of 2D sectional images of the treatment object generated by a medical imaging method.

16. The method according to claim 1 wherein in step a), the image data set comprising the plurality of images of the treatment object is created by a camera of the mixed reality display device and/or by a depth sensor of the mixed reality display device.

17. The method according to claim 16, wherein in step a), when the images are created by the camera of the mixed reality display, a position of the camera is determined in a three-dimensional coordinate system for each image of the plurality of images and stored as 3D camera position and in step b), the target point cloud is generated using the 3D camera positions, and/or in step a), when the images are created by the camera of the mixed reality display, an orientation of the camera is determined in a three-dimensional coordinate system for each image of the plurality of images and stored as 3D camera orientation and in step b), the target point cloud is generated using the 3D camera orientations.

18. The method according to claim 1 wherein any position, any orientation and any transformation determined in steps a) to h) is determined markerless and/or using Simultaneous Localization and Mapping (SLAM).

19. A non-transient storage medium encoded by a program code adapted to perform when the program code is executed on a computer the method of claim 1.

20. A mixed reality display device comprising:
   a display,
   a computer, and
   a non-transient memory,
wherein program code stored in the memory is executable on the computer in order to perform the method of claim 1.

\* \* \* \* \*